(12) United States Patent
Denton et al.

(10) Patent No.: US 9,199,212 B2
(45) Date of Patent: Dec. 1, 2015

(54) DIGESTION UNITS CONFIGURED FOR HIGH YIELD BIOMASS PROCESSING

(71) Applicant: SHELL OIL COMPANY, Houston, TX (US)

(72) Inventors: Edward James Denton, Richmond, TX (US); Thomas Lamar Flowers, Katy, TX (US); Glenn Charles Komplin, Katy, TX (US); Joseph Broun Powell, Houston, TX (US)

(73) Assignee: Shell Oil Company, Houston, TX (US)

( * ) Notice: Subject to any disclaimer, the term of this patent is extended or adjusted under 35 U.S.C. 154(b) by 156 days.

(21) Appl. No.: 13/929,051

(22) Filed: Jun. 27, 2013

(65) Prior Publication Data

US 2014/0004015 A1   Jan. 2, 2014

Related U.S. Application Data

(60) Provisional application No. 61/665,717, filed on Jun. 28, 2012.

(51) Int. Cl.
*D21C 7/00* (2006.01)
*D21C 7/14* (2006.01)
(Continued)

(52) U.S. Cl.
CPC *B01J 8/008* (2013.01); *B01J 4/002* (2013.01); *B01J 8/009* (2013.01); *B01J 8/0292* (2013.01);
(Continued)

(58) Field of Classification Search
CPC .................. B01J 4/00; B01J 7/00; B01J 8/00; B01J 8/02; B01J 8/0242; B01J 8/025; B01J 19/00; B01J 19/18; B01J 19/1868; B01J 19/1881; B01J 19/24; B01J 19/2455; B01J 19/2465; B01J 35/00; B01J 35/02; B01J 2208/00; D21C 3/00; D21C 3/20; D21C 3/22; D21C 3/222; D21C 7/00; D21C 7/06; D21C 7/14; D21C 11/00; D21C 11/0007
See application file for complete search history.

(56) References Cited

U.S. PATENT DOCUMENTS 3,347,741 A * 10/1967 Hutchison ...................... 162/241
3,956,128 A *  5/1976 Turner .......................... 210/150
(Continued)

FOREIGN PATENT DOCUMENTS

FR          2955118        7/2011
WO          9945191        9/1999
(Continued)

OTHER PUBLICATIONS

International Search Report dated Sep. 30, 2013, Application No. PCT/US2013/048212 filed Jun. 27, 2013.
(Continued)

*Primary Examiner* — Natasha Young

(57) ABSTRACT

Digestion units for processing cellulosic biomass can comprise a chamber having a height that is greater than its width, the chamber having an opening suitable for solids introduction located within the upper 20% of its height; one or more first fluid conduits connected to the chamber within the lower 20% of its height, at least one of the first fluid conduits extending into the chamber and being elevated above the bottom of the chamber; one or more second fluid conduits connected to the chamber within the upper 20% of its height, at least one of the first fluid conduits being fluidly coupled to at least one of the second fluid conduits; a porous medium located in the chamber within the lower 20% of its height; and a movable pressure isolation device covering the opening; wherein the digestion unit is operable to maintain a pressure of at least about 30 bar.

40 Claims, 10 Drawing Sheets

(51) Int. Cl.
*B01J 8/00* (2006.01)
*B01J 8/02* (2006.01)
*B01J 19/00* (2006.01)
*B01J 19/24* (2006.01)
*B01J 19/18* (2006.01)
*B01J 4/00* (2006.01)
*D21C 7/06* (2006.01)
*B01J 19/30* (2006.01)
*B01J 19/32* (2006.01)
*D21C 3/00* (2006.01)
*D21C 3/20* (2006.01)
*D21C 3/22* (2006.01)

(52) U.S. Cl.
CPC ............ *B01J 19/006* (2013.01); *B01J 19/1881* (2013.01); *B01J 19/2465* (2013.01); *D21C 7/00* (2013.01); *D21C 7/14* (2013.01); *B01J 2208/003* (2013.01); *B01J 2208/00283* (2013.01); *B01J 2208/00787* (2013.01); *B01J 2208/00884* (2013.01); *B01J 2219/0011* (2013.01); *B01J 2219/00114* (2013.01)

(56) References Cited

U.S. PATENT DOCUMENTS

| | | | | |
|---|---|---|---|---|
| 4,104,113 | A | * | 8/1978 | Sherman et al. ............... 162/19 |
| 5,116,475 | A | * | 5/1992 | Edlund et al. ................. 162/52 |
| 5,426,024 | A | * | 6/1995 | Flores-Cotera et al. .......... 435/3 |
| 5,565,061 | A | * | 10/1996 | Salminen ..................... 162/48 |
| 5,766,413 | A | | 6/1998 | Backlund et al. |
| 6,007,719 | A | * | 12/1999 | Yoo et al. ..................... 210/603 |
| 6,030,915 | A | | 2/2000 | de Boer |
| 6,123,807 | A | | 9/2000 | Engstrom et al. |
| 6,127,299 | A | | 10/2000 | de Boer et al. |
| 6,241,851 | B1 | * | 6/2001 | Marcoccia ..................... 162/19 |
| 8,921,629 | B2 | | 12/2014 | Powell et al. |
| 2005/0274467 | A1 | | 12/2005 | Lawrence et al. |
| 2008/0050792 | A1 | | 2/2008 | Zmierczak et al. |
| 2008/0245496 | A1 | | 10/2008 | Kallmes |
| 2008/0312346 | A1 | | 12/2008 | McCall et al. |
| 2011/0382115 | | | 11/2011 | Powell |
| 2011/0306804 | A1 | | 12/2011 | Cortright |
| 2012/0151827 | A1 | | 6/2012 | Powell et al. |
| 2012/0152836 | A1 | | 6/2012 | Powell et al. |
| 2012/0156742 | A1 | | 6/2012 | Powell et al. |
| 2012/0157730 | A1 | | 6/2012 | Powell et al. |
| 2012/0172588 | A1 | | 7/2012 | Qial et al. |
| 2012/0317872 | A1 | | 12/2012 | Powell et al. |
| 2012/0317873 | A1 | | 12/2012 | Johnson et al. |
| 2013/0152457 | A1 | | 6/2013 | Powell et al. |
| 2013/0152458 | A1 | | 6/2013 | Powell et al. |

FOREIGN PATENT DOCUMENTS

| | | |
|---|---|---|
| WO | 2010025241 | 3/2010 |
| WO | 2012082367 | 6/2012 |
| WO | 2013089796 | 6/2013 |
| WO | 2013089797 | 6/2013 |
| WO | 2013089798 | 6/2013 |
| WO | 2013089799 | 6/2013 |

OTHER PUBLICATIONS

Engineering Doc (Engineering Experiment Station Series Issues 14-25 p. 21 1914, downloaded from the Internet Jun. 25, 2014).
Huizenga et al., "Effect of Internal Filtration on Slurry Reactor Performance", Ing. Eng. Chem. Res. 38, 1999.
International Search Report for PCT/US2013/048222 dated Oct. 2, 2014; 3 pages.

* cited by examiner

DIGESTION UNITS CONFIGURED FOR HIGH YIELD BIOMASS PROCESSING

CROSS-REFERENCE TO RELATED APPLICATION

This present application claims the benefit of U.S. Patent Application No. 61/665,717, filed Jun. 28, 2012, the entire disclosure of which is hereby incorporated by reference.

FIELD OF THE INVENTION

The present disclosure generally relates to digestion, and, more specifically, to digestion units configured for high yield production of a stabilized hydrolysate from cellulosic biomass.

BACKGROUND OF THE INVENTION

A number of substances of commercial significance may be produced from natural sources, including biomass. Cellulosic biomass may be particularly advantageous in this regard due to the versatility of the abundant carbohydrates found therein in various forms. As used herein, the term "cellulosic biomass" refers to a living or recently living biological material that contains cellulose. The lignocellulosic material found in the cell walls of higher plants is the world's largest source of carbohydrates. Materials commonly produced from cellulosic biomass may include, for example, paper and pulpwood via partial digestion, and bioethanol by fermentation.

Significant attention has been placed on developing fossil fuel alternatives derived from renewable resources. Cellulosic biomass has garnered particular attention in this regard due to its abundance and the utility of its constituent carbohydrates. Despite promise and intense interest, the development and implementation of bio-based fuel technology has been slow. Existing technologies have heretofore produced fuels having a low energy density (e.g., bioethanol) and/or that are not fully compatible with existing engine designs and transportation infrastructure (e.g., methanol, biodiesel, Fischer-Tropsch diesel, hydrogen, and methane). An energy- and cost-efficient process for processing cellulosic biomass into fuel blends having similar compositions to fossil fuels would be highly desirable to address the foregoing issues.

Digestion is one way in which the complex carbohydrates within cellulosic biomass can be converted into a form more suitable for being processed into fuel blends. Specifically, digestion can break down the complex carbohydrates within cellulosic biomass into a hydrolysate containing simpler, soluble carbohydrates, which may be further transformed into oxygenated organic compounds through downstream reforming reactions. Although the underlying chemistry behind digesting complex carbohydrates and further transforming simple carbohydrates into organic compounds reminiscent of those present in fossil fuels is understood, high-yield and energy-efficient digestion processes suitable for use in converting cellulosic biomass into fuel blends have yet to be developed. In this regard, the most basic requirement associated with converting cellulosic biomass into fuel blends using digestion and other processes is that the energy input needed to bring about the conversion should not be greater than the available energy output of the product fuel blends. Furthermore, the amounts of the fuel blends produced per unit mass of cellulosic biomass feed should ideally be as high as possible.

The issues associated with digesting cellulosic biomass and converting the hydrolysate into fuel blends in high yields and in an energy- and cost-efficient manner are exceedingly complex, as further discussed hereinafter. In addition, these issues are entirely different than those encountered in the digestion processes commonly used in the paper and pulpwood industry. Since the intent of cellulosic biomass digestion in the paper and pulpwood industry is to retain a solid material (e.g., wood pulp), incomplete digestion is usually performed at low temperatures (e.g., less than about 100° C.) for a fairly short period of time. In contrast, digestion processes suitable for converting cellulosic biomass into fuel blends are ideally configured to maximize yields by solubilizing as much of the original cellulosic biomass charge as possible.

Production of greater quantities of soluble carbohydrates for use in fuel blends via routine modification of paper and pulpwood digestion processes is not feasible for a number of reasons. Simply running the digestion processes of the paper and pulpwood industry for a longer period of time to produce more soluble carbohydrates is undesirable from a throughput standpoint. Use of digestion promoters such as strong alkalis, strong acids, or sulfites to accelerate the digestion rate can increase process costs and complexity due to post-processing separation steps and the possible need to protect downstream components from these agents. Accelerating the digestion rate by increasing the digestion temperature can actually reduce yields due to thermal degradation of soluble carbohydrates that can occur at elevated digestion temperatures. Use of higher digestion temperatures can also be undesirable from an energy efficiency standpoint. In addition, extended digestion times under elevated temperature and pressure conditions may sometimes lead to structural failure issues of the digestion unit if not compensated for in some manner. Any of these difficulties can defeat the economic viability of fuel blends derived from cellulosic biomass.

One way in which soluble carbohydrates within a hydrolysate can be protected from thermal degradation is through subjecting them to a catalytic reduction reaction process, which may include hydrogenation and/or hydrogenolysis reactions. The products of such catalytic reduction reaction processes may be readily transformable into fuel blends through downstream reforming reactions. Stabilizing soluble carbohydrates within a hydrolysate through conducting a catalytic reduction reaction process may allow digestion of cellulosic biomass to take place at higher temperatures without unduly sacrificing yields.

One way in which a hydrolysate derived from cellulosic biomass may be stabilized very efficiently is through conducting a catalytic reduction reaction process concurrently with the digestion process, ideally in the same vessel in which the digestion process takes place. A catalytic reduction reaction process that occurs in the same vessel as a digestion process will be referred to herein as an "in situ catalytic reduction reaction process." In addition to stabilization of the hydrolysate, conducting an in situ catalytic reduction reaction process may be very favorable from an energy efficiency standpoint. Specifically, the digestion of cellulosic biomass is an endothermic process, whereas catalytic reduction reactions are exothermic. Thus, the excess heat generated by the catalytic reduction reaction process may be utilized to drive the digestion process, thereby lowering the amount of additional energy input needed to conduct digestion. Since digestion and catalytic reduction take place together in an in situ catalytic reduction reaction process, there is minimal opportunity for heat transfer loss to take place, as would occur if the catalytic reduction reaction process were to be conducted in a separate location. In addition, conducting the catalytic reduction reaction process in a separate location may increase the risk of degradation of soluble carbohydrates occurring during transit.

Although conducting an in situ catalytic reduction reaction process may be particularly advantageous for purposes of hydrolysate stabilization and energy efficiency, successfully executing such a coupled process may be problematic in other aspects. One significant issue that may be encountered is that of catalyst distribution within the digesting cellulosic biomass charge. Without sufficient catalyst distribution being present, ineffective stabilization of soluble carbohydrates may occur. In addition, maintaining fluid flow within the digestion unit can be another significant issue. The embodiments presented herein address many of the foregoing issues as well as providing related advantages.

SUMMARY OF THE INVENTION

The present disclosure generally relates to digestion, and, more specifically, to digestion units configured for high yield production of a stabilized hydrolysate from cellulosic biomass.

In some embodiments, the present disclosure provides digestion units comprising: a chamber having a height that is greater than its width, the chamber having an opening suitable for solids introduction located within the upper 20% of its height; one or more first fluid conduits connected to the chamber within the lower 20% of its height, at least one of the first fluid conduits extending into the chamber and being elevated above the bottom of the chamber; one or more second fluid conduits connected to the chamber within the upper 20% of its height, at least one of the first fluid conduits being fluidly coupled to at least one of the second fluid conduits so as to establish a fluid circulation loop; a porous medium located in the chamber within the lower 20% of its height; and a movable pressure isolation device covering the opening; wherein the digestion unit is operable to maintain a pressure of at least about 30 bar.

In some embodiments, the present disclosure provides digestion units comprising: a chamber having a height that is greater than its width, the chamber having an opening suitable for solids introduction located within the upper 20% of its height; a screen affixed to the chamber within the lower 20% of its height but above the bottom of the chamber; one or more first fluid conduits connected to the chamber below the screen, at least one of the first fluid conduits extending into the chamber and being elevated above the bottom of the chamber; one or more second fluid conduits connected to the chamber within the upper 20% of its height, at least one of the first fluid conduits being fluidly coupled to at least one of the second fluid conduits so as to establish a fluid circulation loop; and a movable pressure isolation device covering the opening.

The features and advantages of the present disclosure will be readily apparent to one having ordinary skill in the art upon a reading of the description of the embodiments that follows.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
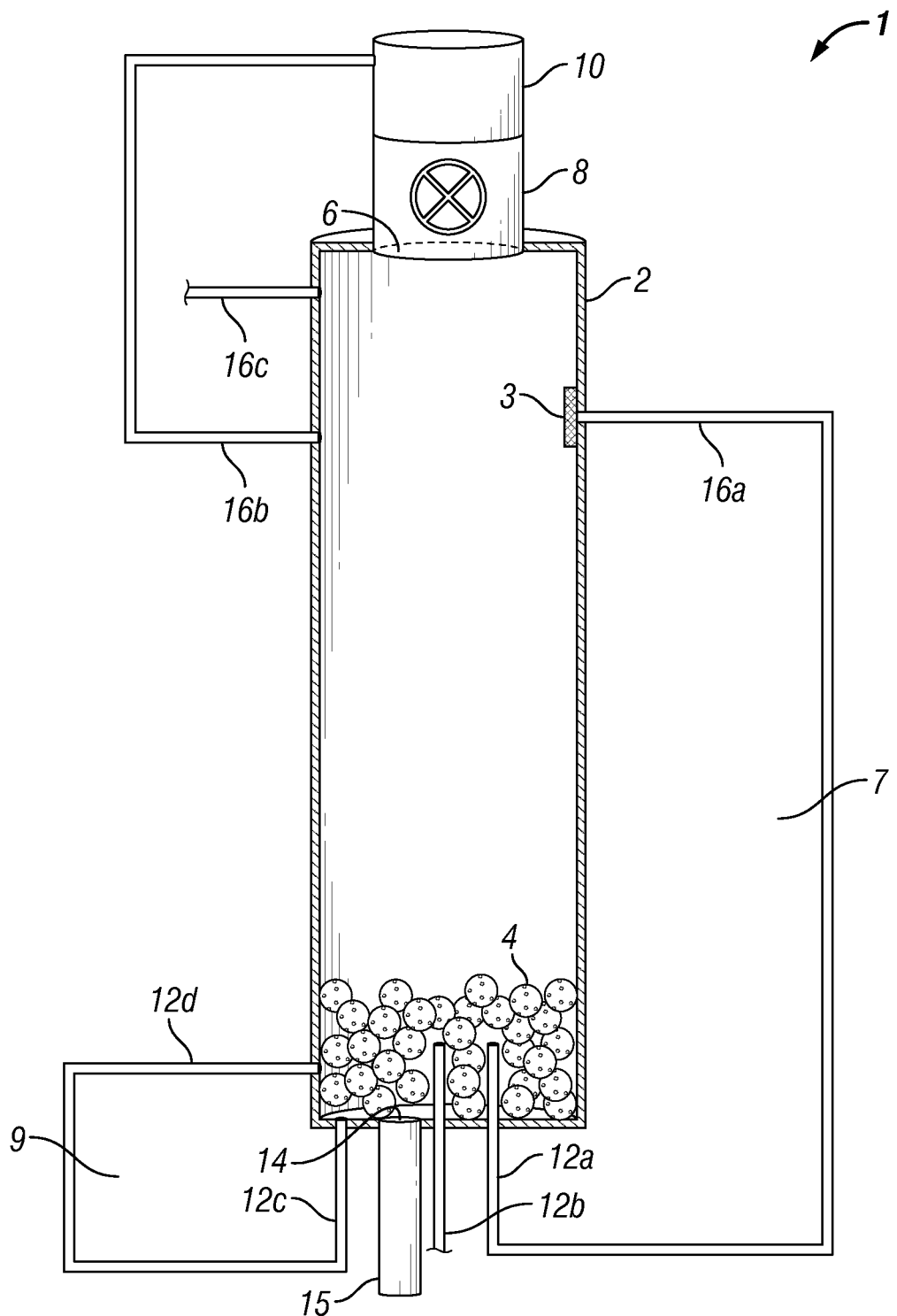
FIG. 1 shows a side-view schematic of an illustrative digestion unit of the present disclosure that contains a porous medium therein.

The present disclosure generally relates to digestion, and, more specifically, to digestion units configured for high yield production of a stabilized hydrolysate from cellulosic biomass.

Digestion units of the present disclosure may be advantageous in terms of facilitating the digestion of cellulosic biomass in an energy- and cost-efficient manner by stabilizing soluble carbohydrates through an in situ catalytic reduction reaction process. Digestion units of the present disclosure are advantageously configured to conduct such an in situ catalytic reduction reaction process in the presence of a digesting pile of cellulosic biomass, which may have a fairly large native particulate size (e.g., greater than about 1 mm). In enabling the foregoing, digestion units of the present disclosure may also facilitate digestion processes conducted with high loadings of cellulosic biomass per unit volume, thereby reducing overall size requirements and material costs for the digestion units. Furthermore, digestion units of the present disclosure may allow the foregoing to be accomplished without having to mechanically stir or otherwise mechanically agitate the cellulosic biomass contained therein.

A leading issue that can be encountered when conducting an in situ catalytic reduction reaction process is that of catalyst distribution within a cellulosic biomass charge. Without sufficient catalyst distribution, soluble carbohydrates within a hydrolysate may have a greater opportunity to degrade by the time they reach a catalyst and undergo catalytic reduction. In contrast, by having a well distributed catalyst, the soluble carbohydrates produced during digestion are usually close to a catalyst that can mediate their stabilization.

One way in which a good catalyst distribution can be achieved is through milling and co-mixing a catalyst and cellulosic biomass together to achieve a small particulate size for each, although this approach may be undesirable from an energy input standpoint. This approach can also lead to the gradual buildup of catalyst in the digestion unit. In addition, as discussed further below, mechanical mixing of the cellulosic biomass and the catalyst in a digestion solvent may be limited to fairly low ratios of cellulosic biomass to digestion solvent, thereby necessitating large vessels to achieve adequate throughput.

A circulating slurry catalyst may be utilized to maintain good catalyst distribution within a cellulosic biomass charge, even without mechanically mixing the cellulosic biomass, by taking advantage of the innate porosity present in packed or partially expanded cellulosic biomass. As used herein, the term "slurry catalyst" refers to a catalyst comprising fluidly mobile catalyst particles that can be at least partially suspended in a fluid phase via gas flow, liquid flow, mechanical agitation, or any combination thereof. The digestion units described herein are advantageously configured to circulate and distribute a slurry catalyst through a cellulosic biomass charge using fluid flow. Use of a circulating slurry catalyst may avoid the difficulties associated with milling and mechanically dispersing other types of catalysts within cellulosic biomass.

Not only are the digestion units described herein capable of distributing a slurry catalyst throughout a cellulosic biomass charge, but they also may accomplish such distribution even when high levels of cellulosic biomass relative to digestion solvent are used (e.g., about 10% or greater cellulosic biomass relative to digestoin solvent). At such high ratios of cellulosic biomass relative to digestion solvent, a viscous paste can form when using milled cellulosic biomass and co-mixed catalyst, which may be difficult to mechanically stir or otherwise mechanically agitate, ultimately leading to poor catalyst distribution. By using larger cellulosic biomass solids having innate bed porosity present therein, we have found that a slurry catalyst may become distributed therein using fluid flow at cellulosic biomass: solvent ratios where distribution would otherwise be difficult (e.g., due to paste formation using smaller-sized cellulosic biomass solids). Without using a slurry catalyst, it would be very difficult to adequately distribute a catalyst within a cellulosic biomass charge using fluid flow, as both the cellulosic biomass and catalyst would only have limited fluid mobility to promote catalyst distribution. The ability to utilize high loadings of cellulosic biomass relative to digestion solvent may be beneficial from the standpoint of being able to produce larger amounts of soluble carbohydrates per unit size of the digestion unit, which may improve process economics. In addition, by utilizing high loadings of cellulosic biomass, smaller volume digestion units may also be used without sacrificing process throughput, which may reduce materials costs associated with fabrication of the digestion unit.

In addition to the foregoing advantages, the digestion units of the present disclosure are configured to address compaction and gravity-induced settling of their cellulosic biomass charge. Without mechanical stirring or like mechanical agitation, gravity-induced settling of the cellulosic biomass may occur, particularly as initial pulp formation occurs. Settled cellulosic biomass may block fluid conduits located within the lower portions of the digestion unit, making it difficult to distribute a slurry catalyst using fluid flow therefrom. The digestion units described herein are configured to segregate their cellulosic biomass charge from at least some of their fluid conduits, thereby reducing the incidence of blocking. Specifically, the digestion units described herein utilize a porous medium, which may comprise a screen or like gridlike structure in some embodiments, in order to at least partially segregate the cellulosic biomass charge from the bottom of the digestion unit.

Attaining a suitably rapid rate of cellulosic biomass digestion can present additional challenges that may be addressed with the digestion units described herein. In order to achieve suitably rapid digestion rates, digestion of cellulosic biomass often needs to be conducted at higher temperatures than are attainable with typical digestion solvents. Accordingly, in order to accelerate the digestion rate, digestion oftentimes needs to be conducted at elevated pressures to achieve digestion temperatures above the normal boiling point of the digestion solvent. For example, digestion temperatures of about 150° C. or greater and pressures of about 30 bar or greater may commonly be used. Digestion units described herein may be constructed with materials suitable for operating in this elevated temperature and pressure regime, particularly in the presence of the corrosive environment of a cellulosic biomass hydrolysate. As another significant advantage, the reaction product formed from the in situ catalytic reduction of soluble carbohydrates may serve as the digestion solvent, in some embodiments, thereby reducing the need to conduct separation operations downstream following digestion and catalytic reduction.

Operation in an elevated temperature and pressure regime also may present additional issues for developing high-throughput and energy-efficient processes for digesting cellulosic biomass. Specifically, maintaining the digestion unit in a pressurized state while introducing cellulosic biomass thereto may be desirable in terms of energy efficiency. Without the ability to add cellulosic biomass to a pressurized digestion unit, significant heat integration inefficiencies would occur upon depressurization, cooling, and reheating of the digestion unit. That is, the particular heat integration benefits that may be realized through conducting an in situ catalytic reduction reaction process would be lost. Accordingly, the digestion units described herein may be configured such that an elevated temperature and pressure state may be maintained while adding cellulosic biomass thereto.

In some embodiments, digestion units described herein can comprise: a chamber having a height that is greater than its width, the chamber having an opening suitable for solids introduction located within the top 20% of its height; one or more first fluid conduits connected to the chamber within the lower 20% of its height, at least one of the first fluid conduits extending into the chamber and being elevated above the bottom of the chamber; one or more second fluid conduits connected to the chamber within the upper 20% of its height, at least one of the first fluid conduits being fluidly coupled to at least one of the second fluid conduits so as to establish a fluid circulation loop; a porous medium located in the chamber within the lower 20% of its height; and a movable pressure isolation device covering the opening; wherein the digestion unit is operable to maintain a pressure of at least about 30 bar.

In some embodiments, digestion units described herein can comprise: a chamber having a height that is greater than its width, the chamber having an opening suitable for solids introduction located within the upper 20% of its height; a screen affixed to the chamber within the lower 20% of its height but above the bottom of the chamber; one or more first fluid conduits connected to the chamber below the screen, at least one of the first fluid conduits extending into the chamber and being elevated above the bottom of the chamber; one or more second fluid conduits connected to the chamber within the upper 20% of its height, at least one of the first fluid conduits being fluidly coupled to at least one of the second fluid conduits so as to establish a fluid circulation loop; and a movable pressure isolation device covering the opening.

Digestion units of the present disclosure will now be described with further reference to the drawings, which are not necessarily to scale. It is to be recognized that the drawings presented herein are for purposes of illustration and not limitation. Well known or common features known to one having ordinary skill in the art may be omitted from the drawings in the interest of clarity. In addition, like elements within the drawings will be referred to using identical reference characters unless otherwise noted herein.

FIG. 1 shows a side-view schematic of an illustrative digestion unit of the present disclosure that contains a porous medium therein. Referring to FIG. 1, digestion unit 1 contains chamber 2 having porous medium 4 located therein. Generally, porous medium 4 extends upwardly within chamber 2 to a level that is about 20% or less of the height of chamber 2. As depicted in FIG. 1, porous medium 4 comprises a plurality of beads, which may be substantially spherical in shape in some embodiments. The beads may comprise a material such as, for example, metal, glass, or a ceramic. In other embodiments, porous medium 4 may comprise a metal plate or a ceramic plate, each having a plurality of openings therein, for example. In still other embodiments, porous medium 4 may comprise a sand bed, for example. In general, porous medium 4 may comprise any shape or structure that does not substantially impede fluid flow or slurry catalyst movement therethrough but provides a barrier capable of inhibiting the settling of undigested or partially digested cellulosic biomass to the bottom of chamber 2. Porous medium 4 may be affixed or non-affixed to chamber 2. As depicted in FIG. 1, the beads comprising porous medium 4 extend substantially to the bottom of chamber 2, but they need not necessarily do so.

The presence of porous medium 4 within chamber 2 may advantageously inhibit a cellulosic biomass charge from blocking first fluid conduits 12a, 12b, 12c, and 12d located within the lower 20% of the height of chamber 2. Although the FIGURES presented herein have depicted four first fluid conduits connected to chamber 2, it is to be recognized that any number between 1 and about 8 may be present. During operation of digestion unit 1, digestion solvent and/or slurry catalyst may be circulated through any of first fluid conduits 12a, 12b, 12c, and 12d. In some embodiments, digestion unit 1 may be operated in an upflow mode by introducing digestion solvent and/or slurry catalyst to chamber 2 through first fluid conduits 12a, 12b, 12c, and 12d. In other embodiments, digestion unit 1 may be operated in a downflow mode by withdrawing digestion solvent and/or slurry catalyst from chamber 2 through first fluid conduits 12a, 12b, 12c, and 12d. In some embodiments, some of first fluid conduits 12a, 12b, 12c, and 12d may be used to add a fluid to chamber 2 and some of first fluid conduits 12a, 12b, 12c, and 12d may be used to withdraw a fluid. Furthermore, first fluid conduits 12a, 12b, 12c, and 12d need not necessarily carry the same fluid. For example, in some embodiments, first fluid conduit 12a may carry digestion solvent and slurry catalyst, first fluid conduit 12c may carry makeup digestion solvent only, and first fluid conduit 12b may carry hydrogen gas for conducting the in situ catalytic reduction reaction process. Although porous medium 4 may be intermingled with first fluid conduits 12a, 12b, 12c, and 12d, as depicted in FIG. 1, porous medium 4 has sufficient porosity so as not to substantially impede the flow of fluid therethrough.

Figure 2:
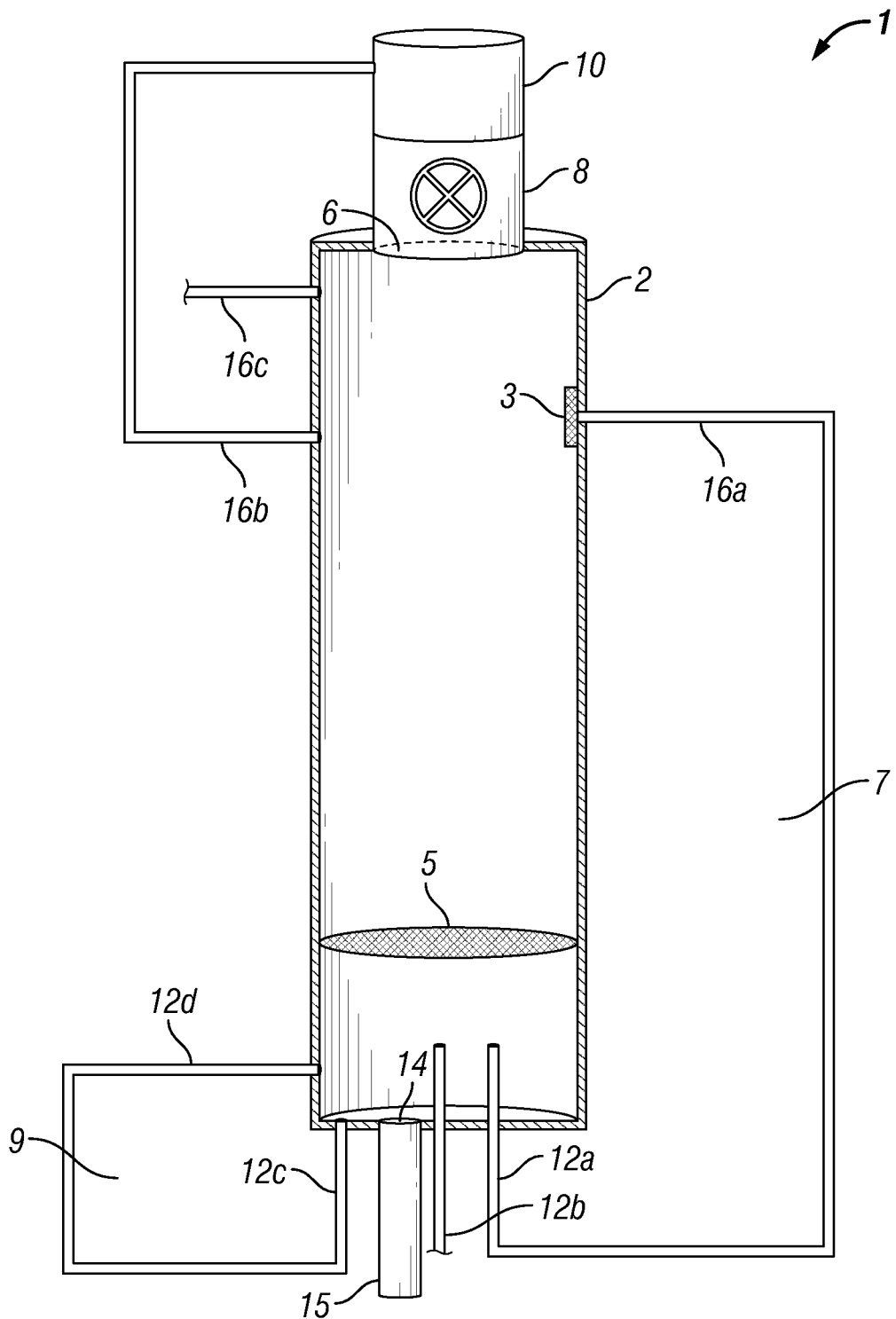
FIG. 2 shows a side-view schematic of an illustrative digestion unit of the present disclosure that contains an affixed screen therein.

In some embodiments, porous medium 4 may comprise a screen or like grid-like structure that is affixed to chamber 2 within the lower 20% of its height but above the bottom of the chamber. FIG. 2 shows a side-view schematic of an illustrative digestion unit of the present disclosure that contains an affixed screen therein. As depicted in FIG. 2, screen 5 may be affixed to chamber 2 within the lower 20% of its height but above the bottom of the chamber in some embodiments. Screen 5 may serve a similar purpose and function in a like manner to that previously described in regard to porous medium 4. In some embodiments, screen 5 may be affixed to chamber 2 within the lower 15% of its height but above the bottom of the chamber. In other embodiments, screen 5 may be affixed to chamber 2 within the lower 10% of its height but above the bottom of the chamber. In still other embodiments, screen 5 may be affixed to chamber 2 within the lower 5% of its height but above the bottom of the chamber. In various embodiments, screen 5 may be affixed to chamber 2 above a level of first fluid conduits 12a, 12b, 12c, and 12d. It is to be recognized that screen 5 and porous medium 4 may be used interchangeably in the embodiments described and depicted herein. For purposes of clarity, subsequent drawings have been depicted with screen 5 only, but it is to be recognized that any embodiments depicted using a screen may be practiced in a similar manner using a like porous medium.

Figure 3:
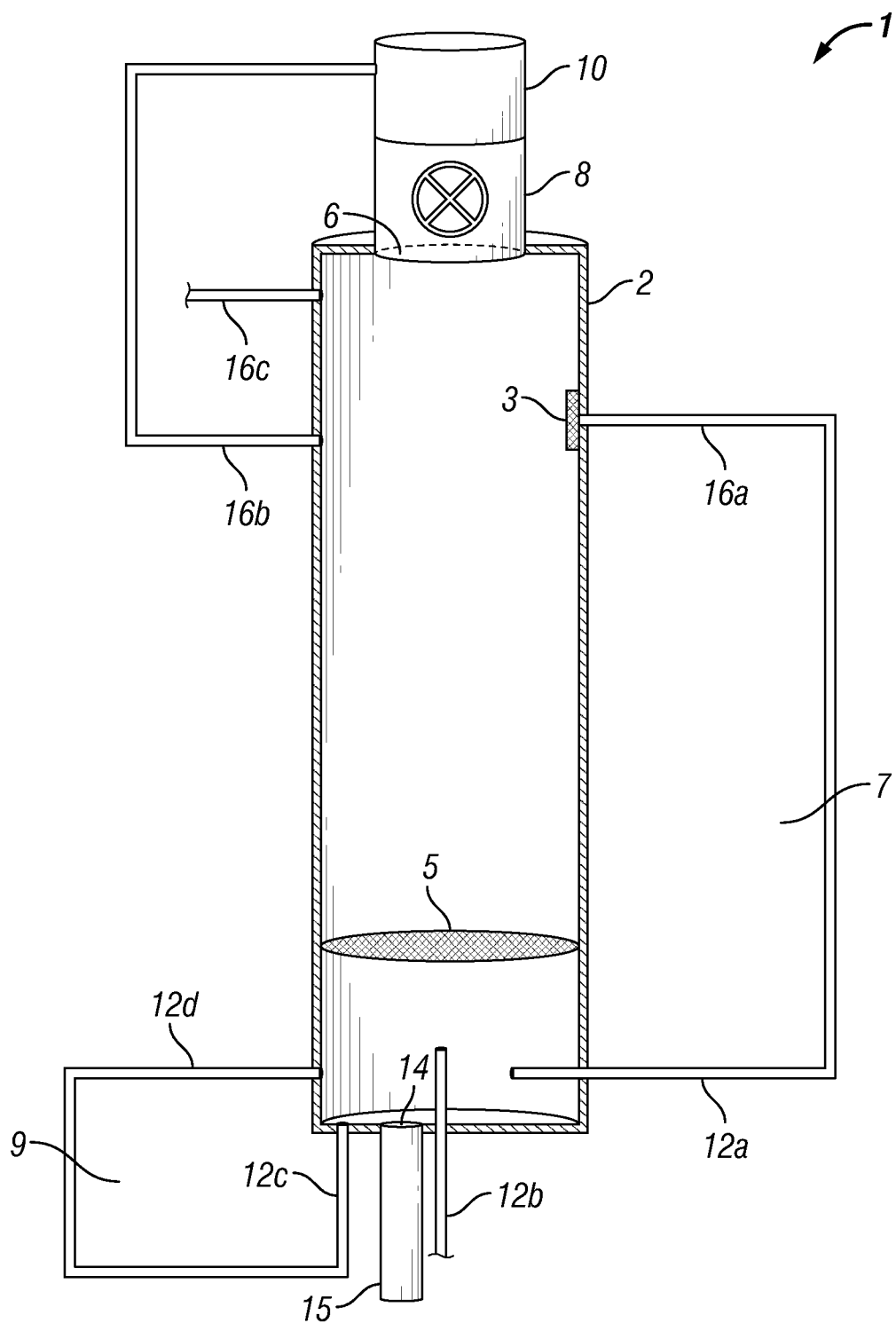
FIG. 3 shows a side-view schematic of an illustrative digestion unit of the present disclosure that contains both bottom- and side-entering first fluid conduits.

In some embodiments, first fluid conduits 12a, 12b, 12c, and 12d may be connected to chamber 2 within the lower 15% of its height. In some embodiments, first fluid conduits 12a, 12b, 12c, and 12d may be connected to chamber 2 within the lower 10% of its height. In some embodiments, first fluid conduits 12a, 12b, 12c, and 12d may be connected to chamber 2 within the lower 5% of its height. As depicted in FIGS. 1 and 2, first fluid conduits 12a, 12b, and 12c enter chamber 2 through its bottom. However, they need not necessarily do so. In some embodiments, each of first fluid conduits 12a, 12b, 12c, and 12d may be connected to the bottom of chamber 2. In other embodiments, only some of first fluid conduits 12a, 12b, 12c, and 12d may be connected to the bottom of chamber 2. In still other embodiments, none of first fluid conduits 12a, 12b, 12c, and 12d may be connected to the bottom of chamber 2. FIG. 3 shows a side-view schematic of an illustrative digestion unit of the present disclosure that contains both bottom- and side-entering first fluid conduits.

Figure 4:
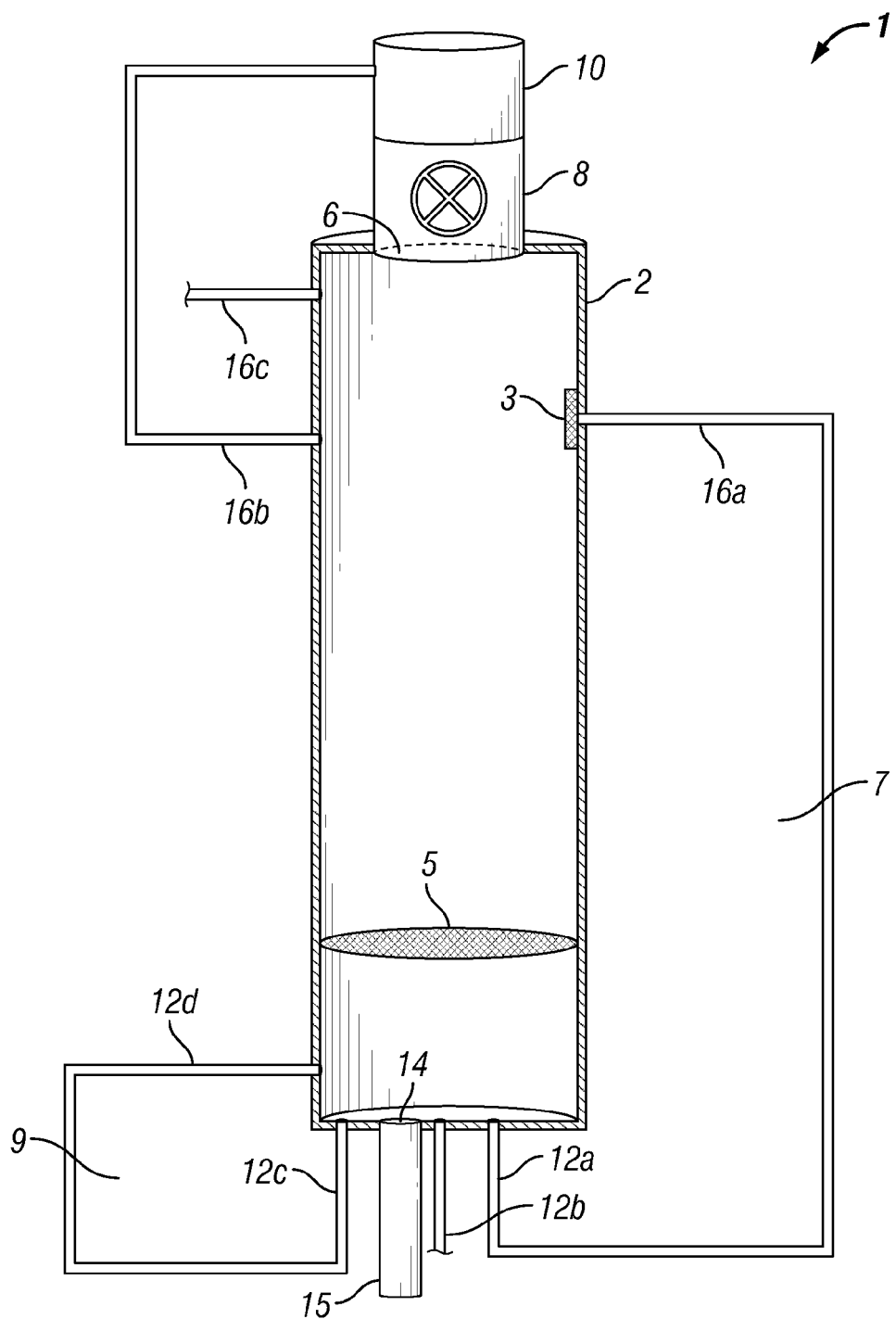
FIG. 4 shows a side-view schematic of an illustrative digestion unit of the present disclosure that contains only non-entering first fluid conduits.

The position of first fluid conduits 12a, 12b, 12c, and 12d within chamber 2 may also vary. In some embodiments, at least one of first fluid conduits 12a, 12b, 12c, and 12d may extend into chamber 2 and be elevated above the bottom of the chamber. In some embodiments, each of first fluid conduits 12a, 12b, 12c, and 12d may extend into chamber 2 and be elevated above the bottom of the chamber. In some embodiments, at least one of first fluid conduits 12a, 12b, 12c, and 12d may be connected to but not extend into chamber 2. In some embodiments, some of first fluid conduits 12a, 12b, 12c, and 12d may extend into chamber 2 and others may be connected to but not extend into chamber 2, as depicted in FIGS. 1-3. In other embodiments, each of first fluid conduits 12a, 12b, 12c, and 12d may be connected to but not extend into chamber 2. FIG. 4 shows a side-view schematic of an illustrative digestion unit of the present disclosure that contains only non-entering first fluid conduits. Extension of at least some of first fluid conduits 12a, 12b, 12c, and 12d above the bottom of chamber 2 may be particularly advantageous for purposes of hydrolysate withdrawal. For example, by introducing a slurry catalyst to chamber 2 through a first fluid conduit elevated above the bottom of chamber 2, stabilized hydrolysate may be withdrawn using another first fluid conduit that is below the introduction point of the slurry catalyst, thereby reducing the risk of blocking the first fluid conduit being used for withdrawal and unduly removing slurry catalyst from chamber 2. In addition, it may be desirable to withdraw stabilized hydrolysate from chamber 2 that does not contain gas bubbles from a hydrogen feed introduced through at least one of first fluid conduits 12a, 12b, 12c, and 12d.

With continued reference to FIGS. 1-4, digestion unit 1 may also comprise one or more second fluid conduits 16a, 16b, and 16c connected to chamber 2 within the upper 20% of its height. Although the FIGURES presented herein have depicted three second fluid conduits connected to chamber 2, it is to be recognized that any number between 1 and about 8 may be present. As with first fluid conduits 12a, 12b, 12c, and 12d, second fluid conduits 16a, 16b, and 16c may be used to carry the same fluid or different fluids, and they may be used to add or withdraw fluids from chamber 2. In some embodiments, second fluid conduits 16a, 16b, and 16c may be connected to chamber 2 within the upper 15% of its height. In other embodiments, second fluid conduits 16a, 16b, and 16c may be connected to chamber 2 within the upper 10% of its height. In still other embodiments, second fluid conduits 16a, 16b, and 16c may be connected to chamber 2 within the upper 5% of its height. As with first fluid conduits 12a12a, 12b, 12c, and 12d, second fluid conduits 16a, 16b, and 16c may extend into chamber 2 or be connected to chamber 2 but not extended into the chamber.

In various embodiments, at least one of first fluid conduits 12a, 12b, 12c, and 12d may be fluidly coupled to at least one of second fluid conduits 16a, 16b, and 16c so as to establish fluid circulation loop 7. For example, as depicted in the FIGURES, first fluid conduit 12a is fluidly coupled to second fluid conduit 16a to establish a continuous flow pathway there between (e.g., fluid circulation loop 7). Fluid circulation loop 7 may be used to circulate a slurry catalyst and digestion solvent through chamber 2, thereby promoting stabilization of a hydrolysate being produced from cellulosic biomass being digested therein. Optional pumps (not shown) may be used within fluid circulation loop 7 to force the circulation of slurry catalyst to occur.

In some embodiments, one or more of second fluid conduits 16a, 16b, and 16c may not be fluidly coupled to one or more of first fluid conduits 12a, 12b, 12c, and 12d. In some embodiments, one or more of second fluid conduits 16a, 16b, and 16c may be used for withdrawal of excess hydrogen used in conducting the in situ catalytic reduction reaction, which may be returned to chamber 2 for recycling, if desired (not shown). In some or other embodiments, one or more of second fluid conduits 16a, 16b, and 16c may be used to withdraw a fluid from chamber 2 for use in pressurizing cellulosic biomass prior to its introduction to chamber 2. Further details regarding the use of a fluid for cellulosic biomass pressurization are provided below.

In some embodiments, some of first fluid conduits 12a, 12b, 12c, and 12d may be fluidly coupled to one another. For example, as depicted in FIGS. 1-4, first fluid conduit 12c may be fluidly coupled to first fluid conduit 12d, thereby establishing fluid circulation loop 9. Optional fluid circulation loop 9 may be used to conduct further thermal balancing of a digestion process being conducted in chamber 2, for example. In other embodiments, first fluid conduit 12d may not be fluidly connected to any of first fluid conduits 12a, 12b, and 12c. When not fluidly connected to other first fluid conduits, fluid conduit 12d may be used for fluid withdrawal and/or sampling or probe access to chamber 2.

With continued reference to FIGS. 1-4, digestion unit 1 may also include solids removal port 14 and line 15 connected to the bottom of chamber 2. Unlike first fluid conduits 12a, 12b, 12c, and 12d, which may be used to add a fluid to or remove a fluid from chamber 2, solids removal port 14 and line 15 are typically only used for removal or maintenance purposes. More specifically, in various embodiments, solids removal port 14 and line 15 may be used for removal of non-digestible residues arising from the digestion process. Accordingly, solids removal port 14 is generally unfiltered. Slurry catalyst and/or cellulosic biomass solids that have become fluidly mobile may also be removed from solids removal port 14, if desired.

Figure 5:
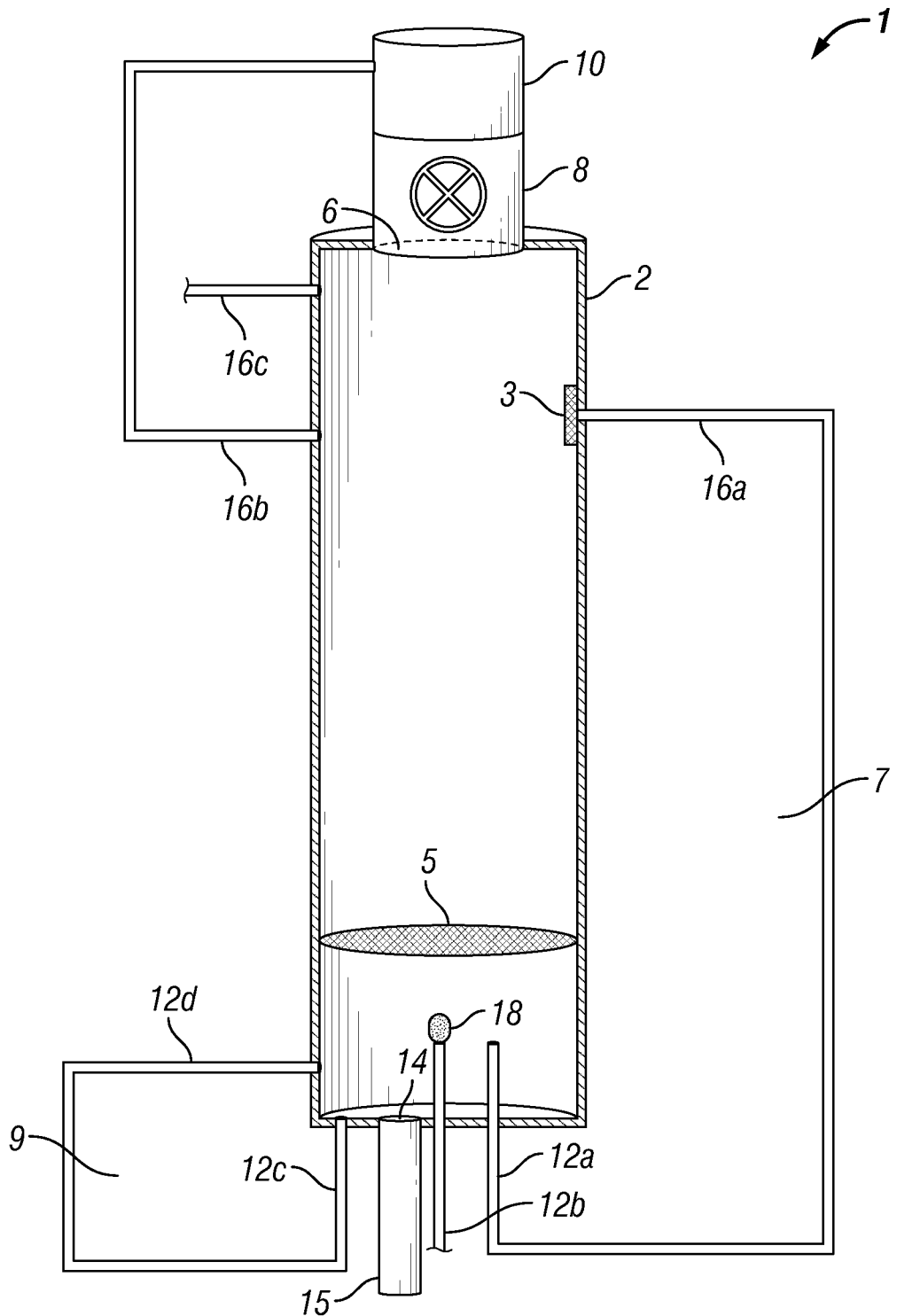
FIG. 5 shows a side-view schematic of an illustrative digestion unit of the present disclosure containing a filtered first fluid conduit.

In some embodiments, at least one of first fluid conduits 12a, 12b, 12c, and 12d may further comprises a filter. Suitable filters may include, for example, metal frits, glass frits, woven filters, polymeric filters, glass filters, and the like. In some embodiments, suitable filters may have be operable to exclude solids of about 100 μm in size or less. In other embodiments, suitable filters may be operable to exclude solids of about 50 μm in size or less, or of about 10 μm in size or less, or of about 1 μm in size or less, or of about 0.5 μm in size or less. FIG. 5 shows a side-view schematic of an illustrative digestion unit of the present disclosure containing a filtered first fluid conduit. As depicted in FIG. 5, first fluid conduit 12b contains frit 18 terminally attached thereto, such that a fluid entering or exiting chamber 2 may be filtered. It is to be recognized that frit 18 need not necessarily be terminally attached to first fluid conduit 12b, and other placements are possible (e.g., within first fluid conduit 12b). In some embodiments, an optional heater (not shown) may be present, which can be used to help maintain frit 18 in an unblocked state.

Figure 6:
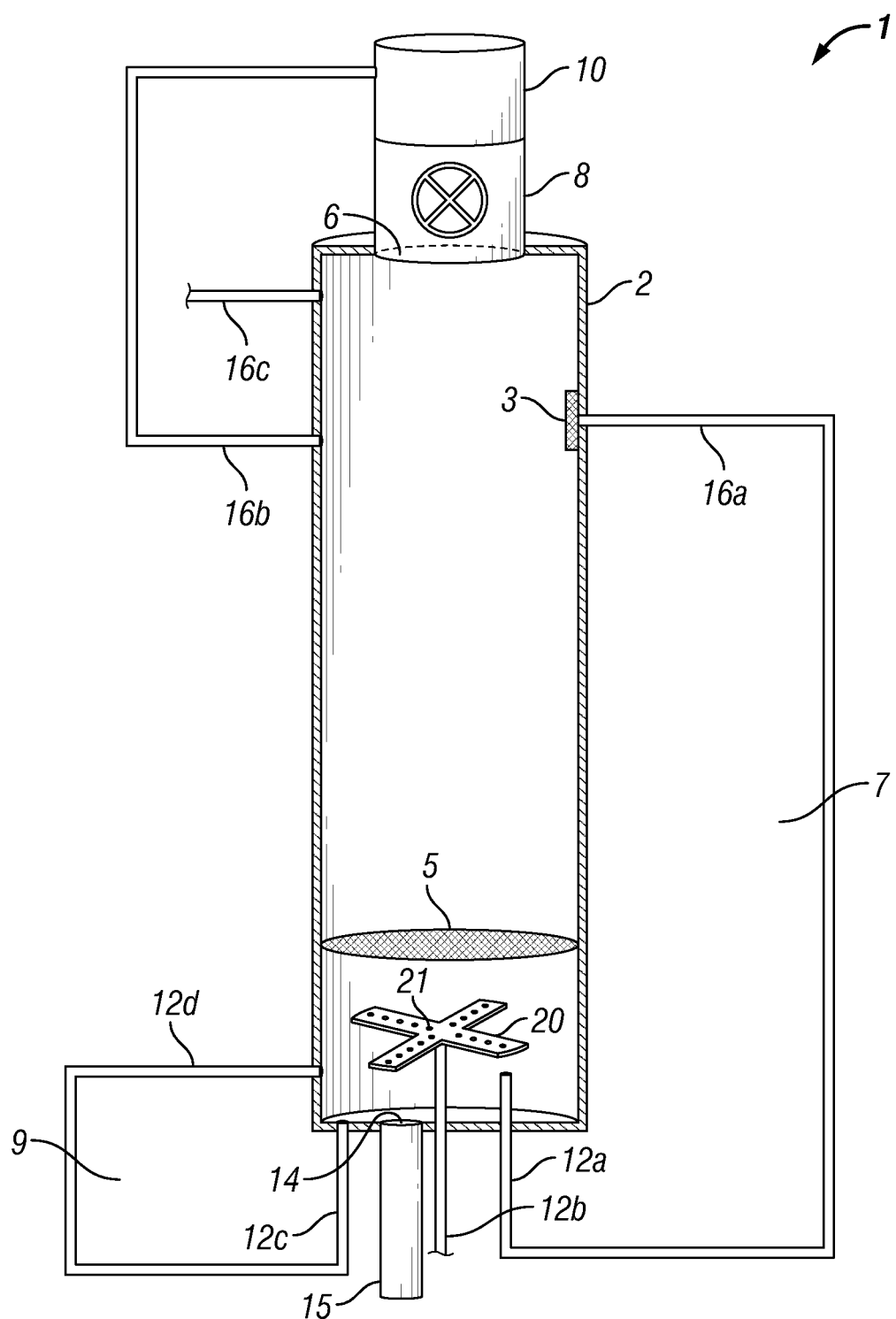
FIGS. 6 and 7 show side-view schematics of illustrative digestion units of the present disclosure containing a flow dispersal system.
Figure 7:
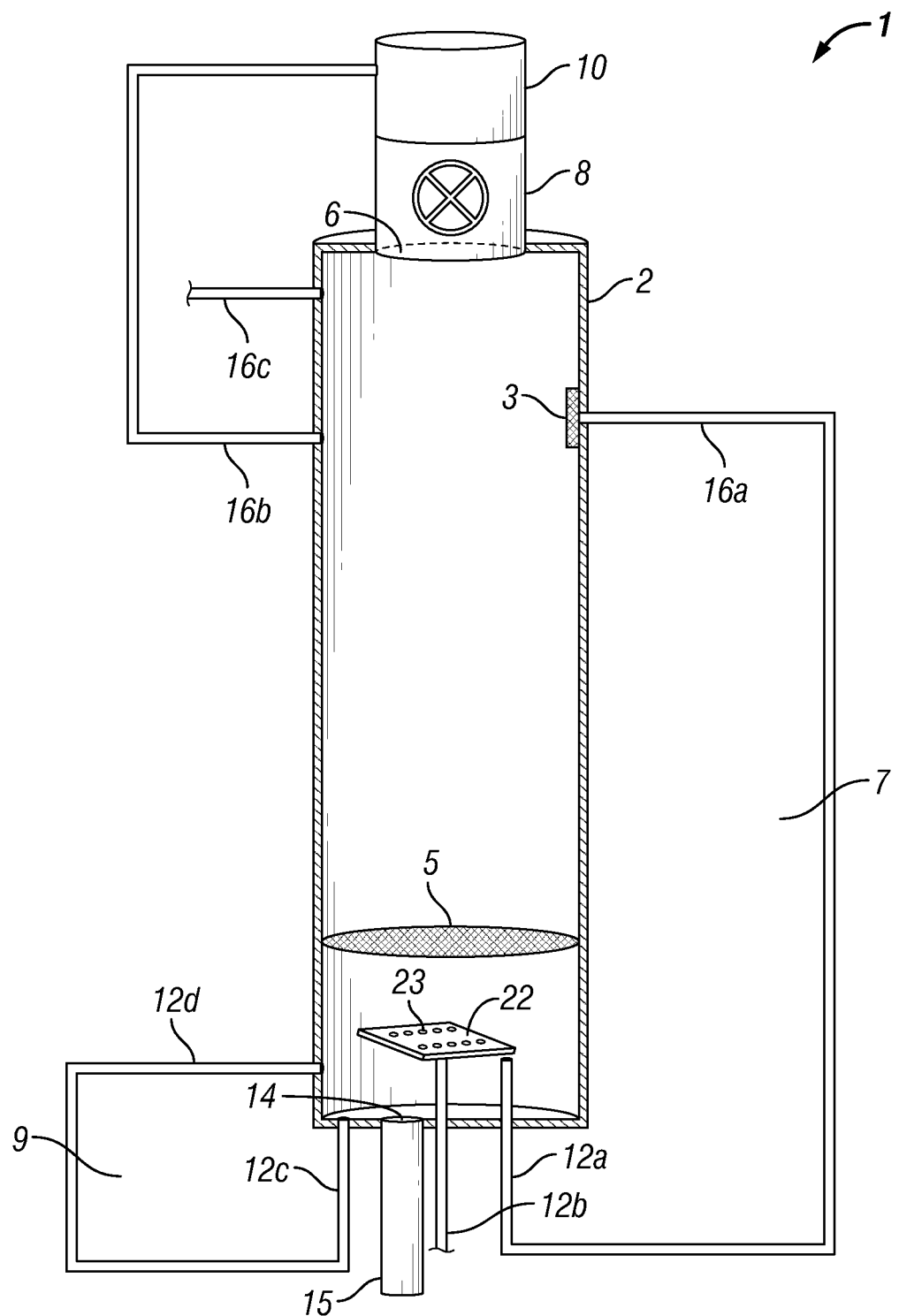

In some embodiments, at least one of first fluid conduits 12a, 12b, 12c, and 12d may be connected to a flow dispersal system within the chamber. In some embodiments, a first fluid conduit connected to a flow dispersal system may be part of a fluid circulation loop. In some or other embodiments, a first fluid conduit connected to a flow dispersal system may be independent of a fluid circulation loop. FIGS. 6 and 7 show side-view schematics of illustrative digestion units of the present disclosure containing a flow dispersal system. Use of a flow dispersal system may promote better distribution of the slurry catalyst in chamber 2 by better spreading its flow therein. Suitable flow dispersal systems are not particularly limited in size or shape. In the embodiment depicted in FIG. 6, the flow dispersal system may comprise tubular element 20 containing a plurality of openings 21 connected to first fluid conduit 12b. In the embodiment depicted in FIG. 7, the flow dispersal system may comprise chamber 22 having a plurality of openings 23 connected to first fluid conduit 12b. Openings 23 may comprise holes, slots, or any combination thereof in various embodiments. When used in conjunction with distributing the slurry catalyst, openings 23 have an opening size that is larger than that of the largest slurry catalyst particulate, so as to reduce the likelihood of plugging. Although FIGS. 6 and 7 have depicted the flow dispersal system connected to first fluid conduit 12b (i.e., not within fluid circulation loop 7), it is to be recognized that the flow dispersal system may be connected to first fluid conduit 12a instead of or in addition to that connected to first fluid conduit 12b.

Opening 6 may be located on chamber 2 and can be used for adding cellulosic biomass thereto. As depicted in FIGS. 1-7, opening 6 may be located on the top of chamber 2, but it may be located elsewhere, if desired. More specifically, opening 6 may be located on chamber 2 within the upper 20% of its height. In various embodiments, opening 6 is covered by movable pressure isolation device 8 so as to be able to maintain chamber 2 in a pressurized state during operation. Movable pressure isolation device 8 may slide, rotate, retract, or any combination thereof to allow introduction of cellulosic biomass solids to take place through opening 6. Suitable movable pressure isolation devices may include, for example, ball valves, gate valves, slider gate valves, knife gate valves, and trunion valves. Generally, movable pressure isolation device 8 needs to allow sufficient access to opening 6 to allow cellulosic biomass to enter chamber 2. Sufficient access may be provided by exposing at least a portion of opening 6 to the cellulosic biomass, where the portion being exposed is at least equal to that of a particulate size of the cellulosic biomass being fed to chamber 2. After cellulosic biomass introduction, movable pressure isolation device 8 should be capable of resealing chamber 2 by closing opening 6. Movable pressure isolation device 8 should be capable of establishing a seal over opening 6 even if residual cellulosic biomass remains trapped therein.

With continued reference to FIGS. 1-7, digestion unit 1 may further comprise pressurizable solids introduction vessel 10 that is operably connected to chamber 2 via movable pressure isolation device 8. Cellulosic biomass may be transferred from pressurizable solids introduction vessel 10 to chamber 2 by opening movable pressure isolation device 8 to expose opening 6. Once cellulosic biomass has been added to chamber 2, movable pressure isolation device 8 can be closed, and chamber 2 can be repressurized if necessary. Although movable pressure isolation device 8 is normally closed during operation of digestion unit 1, it may be open in some embodiments, if, for example, it is desired for the digestion solvent to wash into pressurizable solids introduction vessel 10.

Pressurizable solids introduction vessel 10 may comprise any structure that may be cycled between a low pressure state and a high pressure state for the purpose of introducing cellulosic biomass to chamber 2. Suitable solids introduction vessels may include, for example, pressurizable hoppers, pressurizable screw feeders, pistons, and the like. Further disclosure regarding suitable solids introduction vessels may be found in commonly owned United States Patent Application Publications 2013/0152457 and 2013/0152458, each filed on Dec. 20, 2011 and incorporated herein by reference in its entirety. Pressurizable solids introduction vessel 10 may be used to raise the pressure of cellulosic biomass from a low pressure state to a pressurized state prior to its introduction to chamber 2. Specifically, in some embodiments, pressurizable solids introduction vessel 10 may be used to bring cellulosic biomass from a low pressure state to a pressure at least equal to that present in chamber 2. In some embodiments, multiple pressurizable solids introduction vessels may be used in series to increase the pressure stepwise to a desired level. In some embodiments, a gas may be used to pressurize pressurizable solids introduction vessel 10. In other embodiments, a liquid may be used to pressurize pressurizable solids introduction vessel 10. In still other embodiments, both a gas and a liquid may be used to pressurize pressurizable solids introduction vessel 10. In some embodiments, a liquid being used to pressurize pressurizable solids introduction vessel 10 may be delivered from chamber 2. For example, as generally depicted in FIGS. 1-7, digestion solvent exiting chamber 2 via second fluid conduit 16b may be used to at least partially pressurize pressurizable solids introduction vessel 10. Advantages of pressurizing cellulosic biomass with digestion solvent from chamber 2 may include, for example, infiltrating the cellulosic biomass particles with digestion solvent such that they sink when introduced to chamber 2, weakening the cellulosic biomass structure such that it more readily digests in chamber 2, reducing temperature fluctuations when previously unheated cellulosic biomass is introduced to chamber 2, and any combination thereof. Additionally, in some embodiments, multiple pressurizable solids introduction vessels 10 and openings 6 may be used to introduce cellulosic biomass solids to chamber 2 at more than one location. When multiple pressurizable solids introduction vessels 10 are used, they may be operated in parallel, in series, or any combination thereof.

In some embodiments, during the operation of digestion unit 1, a slurry catalyst may be introduced to the bottom of chamber 2, followed by the introduction of cellulosic biomass. Digestion solvent may then be supplied to chamber 2 via one or more of first fluid conduits 12a, 12b, 12c, or 12d. The upflow of digestion solvent into the cellulosic biomass charge may result in dispersal of the slurry catalyst therein, enabling an in situ catalytic reduction reaction to take place.

Fluid overflow from chamber 2 can be removed by one or more of second fluid conduits 16a, 16b, and 16c. Among the fluids that can be removed include, for example, digestion solvent, soluble carbohydrates, reaction products from a catalytic reduction reaction process, hydrogen, slurry catalyst particles, cellulosic biomass fines, and any combination thereof. As used herein, the term "fluid" refers to a substance that is capable of flowing including gases, liquids, particulate solids, and any combination thereof. As used herein, the term "cellulosic biomass fines" refers to fluidly mobile particulates of cellulosic biomass than have a nominal diameter of about 3 mm or less. As depicted in FIGS. 1-7, second fluid conduit 16a is fluidly coupled to first fluid conduit 12a so as to establish fluid circulation loop 7, whereby the fluid can be returned to chamber 2 and further digestion continued. In addition to promoting catalyst dispersal in the cellulosic biomass charge, fluid circulation through chamber 2 via fluid circulation loop 7 may also help regulate the temperature within chamber 2. Specifically, sufficiently rapid fluid circulation may be used to achieve sufficient mixing to level any thermal gradients that may regionally occur in chamber 2 during digestion. In some cases, however, regional temperature gradients may be desirable, and in those cases, the rate of fluid circulation may be lowered to maintain the regional thermal gradient. In still other embodiments, heaters or coolers within fluid circulation loop 7 (e.g., in thermal contact with first fluid conduit 12a and/or second fluid conduit 16a) may be used to regulate temperature within chamber 2.

In some embodiments, a screen or grid-like structure may cover or be located at or within at least one of the second fluid conduits. Referring again to FIGS. 1-7, in some embodiments, optional screen 3 may be located at the entrance of second fluid conduit 16a or within second fluid conduit 16a. Screen 3 may be used to retain cellulosic biomass within chamber 2 but allow the circulating slurry catalyst and/or cellulosic biomass fines to pass therethrough so as to maintain catalyst distribution. Use of screen 3 may be beneficial if the rate of upwardly directed fluid flow becomes high enough to fluidize the cellulosic biomass charge in chamber 2, potentially removing it from chamber 2. In the event that fluid flow through screen 3 becomes blocked by solids, fluid flow therethrough may be reversed to "blow back" the plugging solids into chamber 2.

In some embodiments, the width of chamber 2 may be variable. Variation of the width of chamber 2 may provide a number of advantages including, for example, easier introduction of cellulosic biomass and the opportunity to better control fluid and fluidizable solids flow dynamics in chamber 2. In some embodiments, the width of chamber 2 may increase within the upper 80% of its height. In some embodiments, the width of chamber 2 may increase between the top of chamber 2 and porous medium 4 or screen 5. An increasing width of chamber 2 in this region may promote the gravity-induced drop of cellulosic biomass into chamber 2 and reduce the likelihood of unwanted blockages taking place in the upper portions of chamber 2. Although the width may decrease in the foregoing region, if desired, it is not anticipated that such configurations may be more susceptible to undesirable biomass blockages at or near the points of narrowing.

Figure 8:
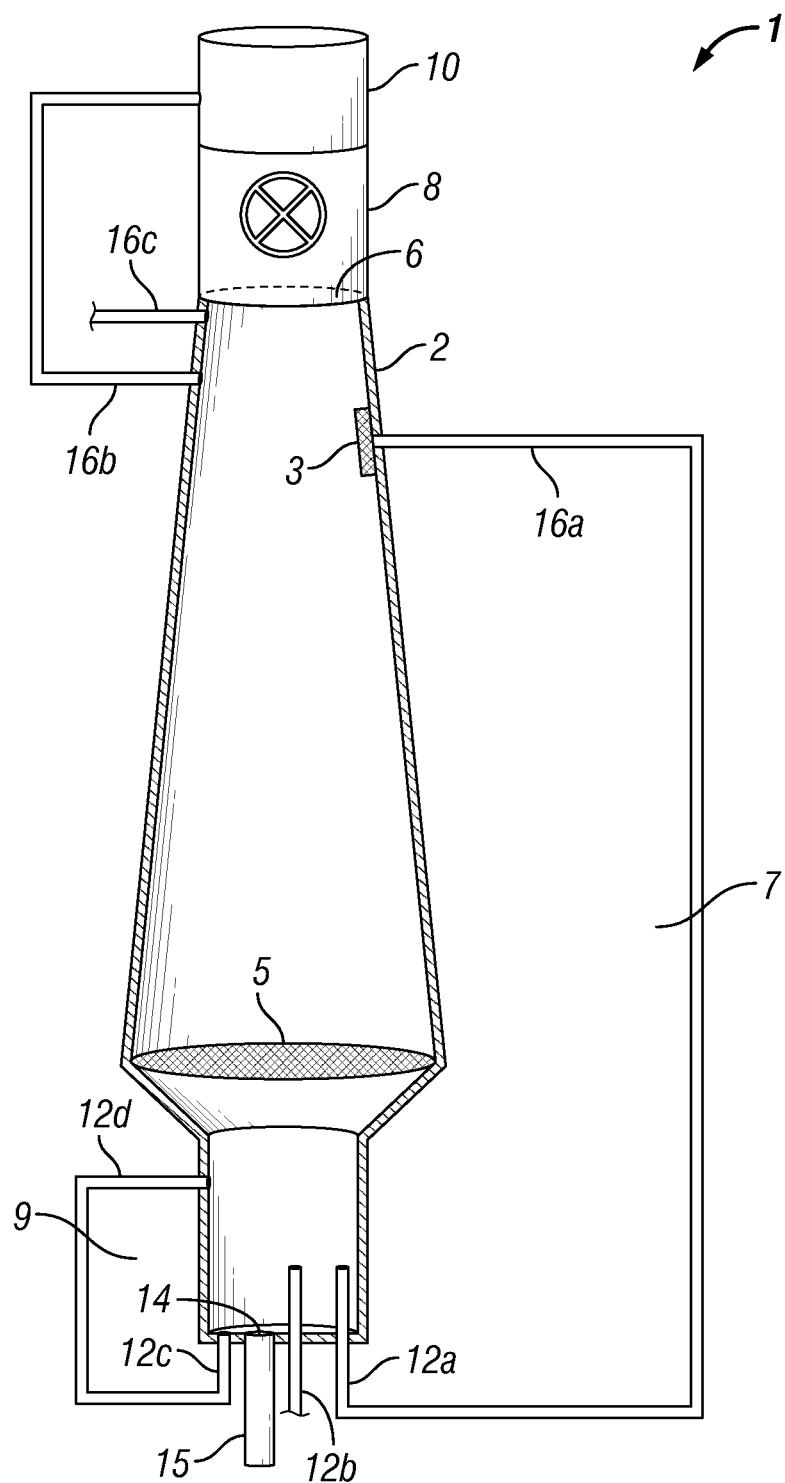
FIG. 8 shows a side-view schematic of an illustrative digestion unit of the present disclosure that has a continually increasing width above its screen.

In some embodiments, the width of chamber 2 may increase continually. As used herein, the terms "continually increase," "continually increasing," and other variants thereof refer to a change in the width of chamber 2 as a function of its height in which the rate of change of the width with height is greater than zero. That is, once the width starts increasing, it does not stop. FIG. 8 shows a side-view schematic of an illustrative digestion unit of the present disclosure that has a continually increasing width above its screen.

Figure 9:
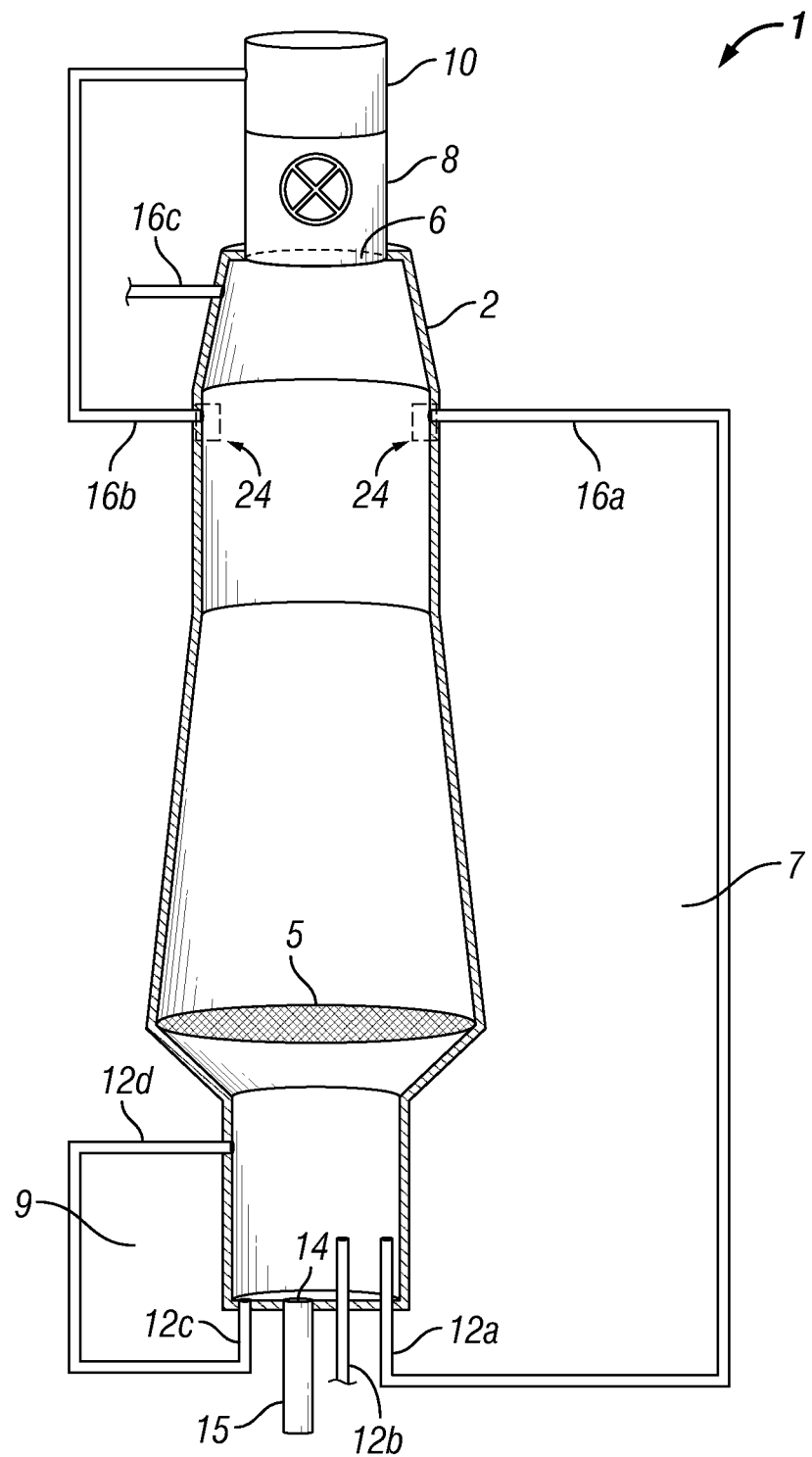
FIG. 9 shows a side-view schematic of an illustrative digestion unit of the present disclosure that has a non-continually increasing width above its screen.

In some embodiments, the width of chamber 2 may increase non-continually. As used herein, the terms "non-continually increase," "non-continually increasing," and other variants thereof refer to a change in the width of chamber 2 as a function of its height in which the rate of change of the width with height is greater than zero in some portions of the height and substantially zero in other portions of the height. That is, once the width starts increasing, it may stop increasing for time and then begin increasing again. FIG. 9 shows a side-view schematic of an illustrative digestion unit of the present disclosure that has a non-continually increasing width above its screen.

For both a continually increasing width and a non-continually increasing width, the rate of increase may be fixed in some embodiments or variable in other embodiments. It is to be recognized that in FIGS. 8 and 9, the depicted rates of increase are for purposes of illustration and not limitation. No limitations are implied by the depicted rates of change, the point(s) at which the width changes, or any other parameter associated therewith. Furthermore, the width of chamber 2 may increase and then remain constant more than the one time depicted in FIG. 9.

In some embodiments, the width of chamber 2 may remain substantially constant within the lower 20% of its height, as depicted in FIGS. 1-7. In other embodiments, the width of chamber 2 may decrease within the lower 20% of its height, as depicted in FIGS. 8 and 9. In some embodiments, the width of chamber 2 may remain substantially constant within the upper 80% of its height and then decrease within the lower 20% of its height. In other embodiments, the width of chamber 2 may increase within the upper 80% of its height and then remain constant within the lower 20% of its height. In still other embodiments, the width of chamber 2 may increase within the upper 80% of its height and then decrease within the lower 20% of its height. For example, in some embodiments, the width of chamber 2 may decrease below screen 5. Among other advantages, a decreasing width of chamber 2 below screen 5 may allow better flow dynamics to be realized when circulating the slurry catalyst back to the cellulosic biomass charge. In addition, by decreasing the width of chamber 2 in the lower 20% of its height, the chamber's weight and fabrication costs may be lowered without substantially impacting throughput capabilities and one's ability to effectively introduce cellulosic biomass thereto.

One additional advantage that may be associated with having a chamber that non-continually increases in width in the upper 80% of its height is that a substantially biomass-free region may be established in chamber 2 following addition of cellulosic biomass thereto. Specifically, region 24 of chamber 2, depicted in FIG. 9, may remain substantially free of cellulosic biomass. Region 24 may be a convenient location for removal of a fluid from chamber 2 via second fluid conduits 16a and 16b, since there may be a lower likelihood of unwanted blockages of biomass with a fluid removed from that location. It should be noted that it is not anticipated that a fluid removed from region 24 will be totally solids-free, since slurry catalyst, cellulosic biomass fines, non-digestible solids, and the like may fluidly migrate there during operation of digestion unit 1. Presence of the latter substances is believed to present a lower likelihood of plugging.

In some embodiments, porous medium 4 may be affixed to chamber 2. In other embodiments, porous medium 4 may be non-affixed to chamber 2. As used herein, the term "affixed" refers to a condition of being held in place through a physical or chemical attachment. In embodiments in which screen 5 is present, the screen may be affixed to chamber 2.

In some embodiments, screen 5 may be permanently affixed to chamber 2. As used herein, the term "permanently affixed" refers to a condition of being held in place through an attachment that is not intended to be broken. Suitable attachment means for permanently affixing screen 5 to chamber 2 may include, for example, welds, solders, adhesives, and the like. In some embodiments, screen 5 may be permanently affixed to chamber 2 by integrally incorporating a portion of screen 5 within the body of the structure of chamber 2. Although a permanently affixed screen is not intended to be removed from chamber 2, it should be understood that a permanently affixed screen may be removed if deemed necessary. For example, if screen 5 is damaged is some way, replacement may be desirable. Ways in which a permanently affixed screen can be removed and replaced include, for example, breaking welds, debonding adhesives, reworking a solder, and the like, a permanently affixed screen may be removed and replaced, if desired.

In one embodiment, the porous medium is affixed to the chamber of the digestion unit. Such porous medium may comprise a screen affixed to the chamber within the lower 20% of its height but above the bottom of the chamber. Further, the width of the chamber may increase between the top of the chamber and the screen. The width of the chamber may decrease below the screen. The screen may be permanently affixed to the chamber or the screen may be removably affixed to the chamber. The location of the screen within the chamber may be adjustable.

In some embodiments, screen 5 may be removably affixed to chamber 2. As used herein, the term "removably affixed" refers a condition of being held in place through an attachment that is intended to be periodically broken and subsequently re-established. Suitable attachment means for removably affixing screen 5 to chamber 2 may include, for example, clips, screws, nails, brackets, slots, brads, nuts and bolts, wire, and like fastener mechanisms. In some embodiments, screen 5 may be removably affixed to chamber 2 by a compression fitting. That is, in such embodiments, screen 5 may be held in place within chamber 2 through mechanical resistance rather than through use of a fastener mechanism.

When screen 5 is removably affixed to chamber 2, a location of screen 5 within chamber 2 may be adjustable in some embodiments. More specifically, in some embodiments, the vertical position of screen 5 may be altered within chamber 2. In some embodiments, the attachment means removably affixing screen 5 to chamber 2 may be adjustable so as to alter their vertical position. In other embodiments, a plurality of attachment means may be located at different fixed vertical positions within chamber 2 to allow the location of screen 5 to be altered. In still other embodiments, screen 5 may be compression fit within chamber 2 at various points along its height.

In some embodiments, multiple screens 5 may be used within chamber 2. When multiple screens 5 are used, they may be in physical contact from one another in some embodiments or spaced apart from one another in other embodiments. When multiple screens 5 are used, in some embodiments, each screen may be configured to retain substantially the same size of particulate solids (e.g., by having the same opening size). In other embodiments, however, multiple screens 5 may be configured to retain different sizes of particulate solids. For example, multiple screens 5 configured to retain different particulate sizes may be used to localize differentially sized particulate solids at desired regions within chamber 2. Any number of screens 5 may be employed.

Figure 10:
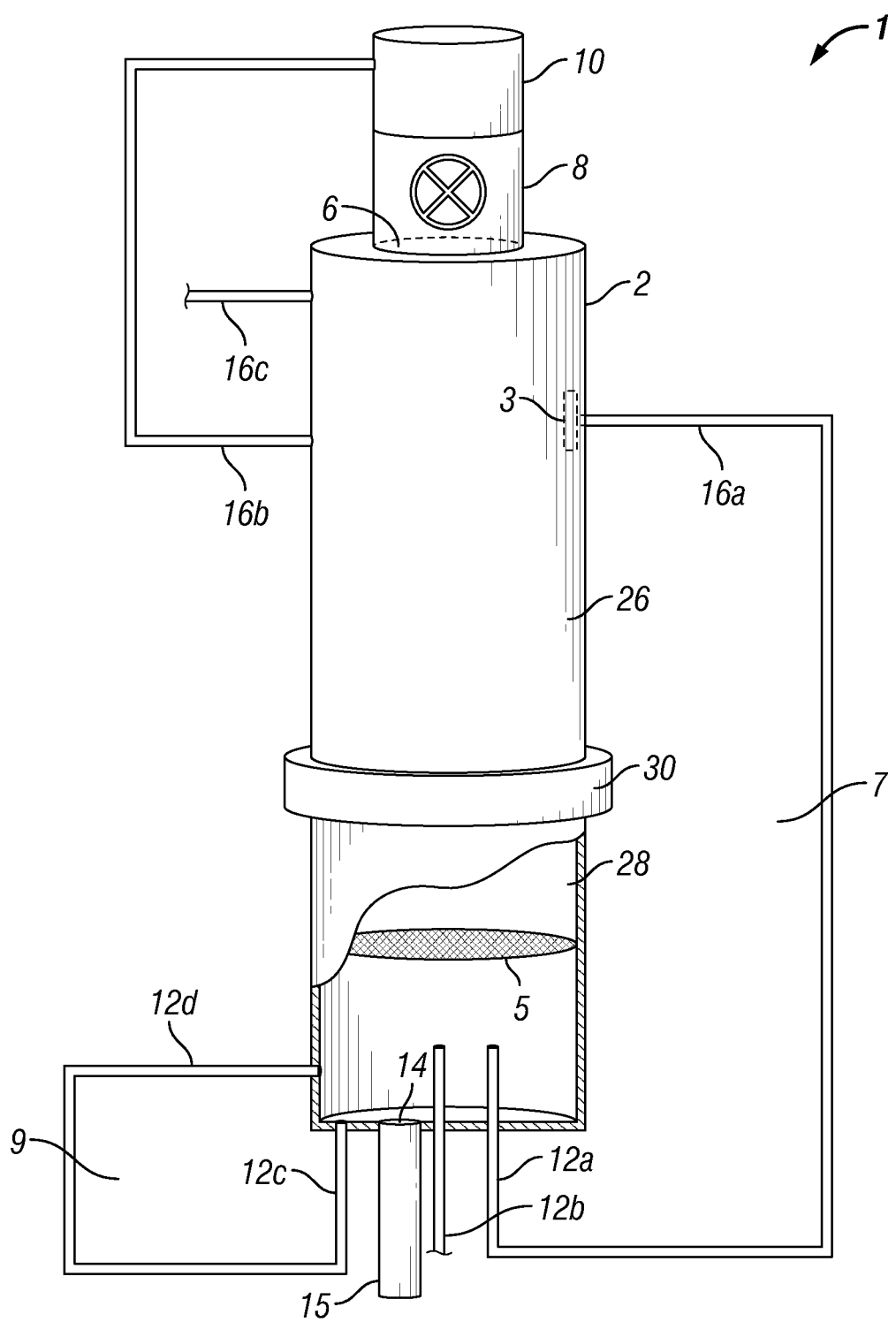
FIG. 10 shows a side-view schematic of an illustrative digestion unit of the present disclosure which contains a chamber that is fixedly coupled together.

In some embodiments, chamber 2 may comprise two or more segments that are fixedly coupled together. FIG. 10 shows a side-view schematic of an illustrative digestion unit of the present disclosure which contains a chamber that is fixedly coupled together. As depicted in FIG. 10, chamber 2 contains segments 26 and 28, which are fixedly coupled together by connection 30. In some embodiments, segments 26 and 28 may be fixedly coupled together through a permanent connection such as a weld, for example. In other embodiments, segments 26 and 28 may be removably coupled together through a connection such as a flange, for example. One advantage of dividing chamber 2 into two or more segments is that greater flexibility may be exercised in conducting and/or optimizing the digestion process. Specifically, the configuration of chamber 2 may be altered if an in situ catalytic reduction reaction process is not taking place as desired. For example, in various embodiments, the overall height of chamber 2 may be altered, the width of chamber 2 may be altered in one or more segments, the position of screen 5 may be altered within chamber 2, or any combination thereof. Another advantage of dividing chamber 2 into two or more segments is that it may be easier to perform maintenance therein. For example, in some embodiments, a chamber having two or more segments may be disassembled to remove affixed solids from a screen or to repair or replace a damaged screen.

In some embodiments, digestion units described herein may be operable for maintaining a pressure of at least about 30 bar while conducting digestion at an operating temperature of at least about 150° C. In some embodiments, digestion units described herein may be operable for maintaining a pressure of at least about 50 bar while conducting digestion at an operating temperature of at least about 150° C. In some embodiments, digestion units described herein may be operable for maintaining a pressure of at least about 70 bar while conducting digestion at an operating temperature of at least about 150° C. In some embodiments, digestion units described herein may be operable for maintaining a pressure of at least about 100 bar while conducting digestion at an operating temperature of at least about 150° C. In some embodiments, the operating temperature at which digestion is conducted may be at least about 200° C. In some embodiments, the operating temperature at which digestion is conducted may be at least about 250° C. In some embodiments, the operating temperature at which digestion is conducted may be at least about 300° C.

Digestion of cellulosic biomass at the foregoing temperatures and pressures can present certain concerns with regard to construction of the digestion units. Not only should the digestion units be capable of withstanding high fluid pressures and elevated operating temperatures, but they should also be chemically inert to the hydrolysate at these temperatures. At elevated temperatures and pressures, inorganic chlorides leeched from cellulosic biomass during digestion may be particularly damaging to components of the digestion units if the wrong materials are used in their construction. In particular, corrosion may be problematic under the intended operating conditions of the digestion unit unless suitable materials are used for its construction. In addition, hydrogen embrittlement of the digestion unit may be problematic under the intended operating conditions. Particularly suitable materials for construction of the digestion units of the present disclosure may include, for example, aluminum, titanium, zirconium, carbon steel, duplex steel, chromium-molybdenum steel, or higher alloy steels such as, for example, HASTELLOY-C, ALLOY 20, ICONEL 825, or ICONEL 625, but it should be recognized that many other types of materials may be used. In some or other embodiments, at least a portion of the interior of the digestion units of the present disclosure may be coated with a polymer or like corrosion-resistant liner in order to improve their corrosion resistance.

It is to be understood that the digestion units heretofore described are not limited to the depicted embodiments. Although not expressly set forth in the present disclosure, various optional features may be present in any of the digestion units described herein. Without limitation these optional features may include, for example, various heating and cooling streams, windows, probes, thermocouples, pumps, pressure sensors, compressors, manways, fluid gauges, connection ports, pressure relief valves, overpressure bursting disks, sample lines, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While apparatuses are described herein in terms of "comprising," "containing," or "including" various components, the apparatuses can also "consist essentially of" or "consist of" the various components. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A digestion unit comprising:
 a chamber having a height that is greater than its width, the chamber having an opening suitable for solids introduction located within the upper 20% of its height;
 one or more first fluid conduits connected to the chamber within the lower 20% of its height, at least one of the first fluid conduits extending into the chamber and being elevated above the bottom of the chamber;
 one or more second fluid conduits connected to the chamber within the upper 20% of its height, at least one of the first fluid conduits being fluidly coupled to at least one of the second fluid conduits so as to establish a fluid circulation loop;

a porous medium located in the chamber within the lower 20% of its height, wherein the porous medium extends across the width of the chamber and is configured to inhibit at least a portion of solids from settling at the bottom of the chamber; and a movable pressure isolation device covering the opening;

wherein the digestion unit is operable to maintain a pressure of at least about 30 bar.

2. The digestion unit of claim 1, further comprising:
a pressurizable solids introduction vessel that is operably connected to the chamber via the movable pressure isolation device.

3. The digestion unit of claim 1, wherein the chamber lacks a mechanical stirring apparatus.

4. The digestion unit of claim 1, wherein at least one of the first fluid conduits is connected to the bottom of the chamber.

5. The digestion unit of claim 1, wherein at least one of the first fluid conduits further comprises a filter.

6. The digestion unit of claim 1, wherein at least one of the first fluid conduits is connected to a flow dispersal system within the chamber.

7. The digestion unit of claim 1, wherein the opening is located on the top of the chamber.

8. The digestion unit of claim 1, wherein the movable pressure isolation device comprises a valve selected from the group consisting of a ball valve, a gate valve, a slider gate valve, a knife gate valve, and a trunion valve.

9. The digestion unit of claim 1, wherein the width of the chamber is variable.

10. The digestion unit of claim 9, wherein the width of the chamber increases within the upper 80% of its height.

11. The digestion unit of claim 10, wherein the width of the chamber non-continually increases.

12. The digestion unit of claim 10, wherein the width of the chamber decreases within the lower 20% of its height.

13. The digestion unit of claim 1, wherein the porous medium is selected from the group consisting of a ceramic screen, a metal screen, a ceramic plate, a metal plate, glass beads, ceramic beads, metal beads, sand, and any combination thereof.

14. The digestion unit of claim 1, wherein the porous medium is affixed to the chamber.

15. The digestion unit of claim 14, wherein the porous medium comprises a screen is affixed to the chamber within the lower 20% of its height but above the bottom of the chamber.

16. The digestion unit of claim 15, wherein the width of the chamber increases between the top of the chamber and the screen.

17. The digestion unit of claim 15, wherein the width of the chamber decreases below the screen.

18. The digestion unit of claim 15, wherein the screen is permanently affixed to the chamber.

19. The digestion unit of claim 15, wherein the screen is removably affixed to the chamber.

20. The digestion unit of claim 19, wherein a location of the screen within the chamber is adjustable.

21. The digestion unit of claim 1, wherein the chamber comprises two or more segments that are fixedly coupled together.

22. The digestion unit of claim 1, further comprising:
a screen covering or located at or within at least one of the second fluid conduits.

23. A digestion unit comprising:
a chamber having a height that is greater than its width, the chamber having an opening suitable for solids introduction located within the upper 20% of its height;
a screen affixed to the chamber within the lower 20% of its height but above the bottom of the chamber, wherein the screen extends across the width of the chamber and is configured to inhibit at least a portion of solids from settling at the bottom of the chamber;
one or more first fluid conduits connected to the chamber below the screen, at least one of the first fluid conduits extending into the chamber and being elevated above the bottom of the chamber;
one or more second fluid conduits connected to the chamber within the upper 20% of its height, at least one of the first fluid conduits being fluidly coupled to at least one of the second fluid conduits so as to establish a fluid circulation loop; and
a movable pressure isolation device covering the opening.

24. The digestion unit of claim 23, further comprising:
a pressurizable solids introduction vessel that is operably connected to the chamber via the movable pressure isolation device.

25. The digestion unit of claim 23, wherein the chamber lacks a mechanical stirring apparatus.

26. The digestion unit of claim 23, wherein the width of the chamber is variable.

27. The digestion unit of claim 26, wherein the width of the chamber increases between the top of the chamber and the screen.

28. The digestion unit of claim 27, wherein the width of the chamber non-continually increases.

29. The digestion unit of claim 27, wherein the width of the chamber decreases below the screen.

30. The digestion unit of claim 26, wherein the width of the chamber decreases below the screen.

31. The digestion unit of claim 23, wherein at least one of the first fluid conduits is connected to the bottom of the chamber.

32. The digestion unit of claim 23, wherein the opening is located on the top of the chamber.

33. The digestion unit of claim 23, wherein at least one of the first fluid conduits further comprises a filter.

34. The digestion unit of claim 23, wherein at least one of the first fluid conduits is connected to a flow dispersal system within the chamber.

35. The digestion unit of claim 23, wherein the movable pressure isolation device comprises a valve selected from the group consisting of a ball valve, a gate valve, a slider gate valve, a knife gate valve, and a trunion valve.

36. The digestion unit of claim 23, wherein the screen is permanently affixed to the chamber.

37. The digestion unit of claim 23, wherein the screen is removably affixed to the chamber.

38. The digestion unit of claim 37, wherein a location of the screen within the chamber is adjustable.

39. The digestion unit of claim 23, further comprising:
a solids removal port located on the bottom of the chamber.

40. The digestion unit of claim 23, further comprising:
a screen covering or located at or within at least one of the second fluid conduits.

* * * * *